T. O. PERRY.
AIRCRAFT FOR MECHANICAL FLIGHT AND AUTOMATIC SOARING.
APPLICATION FILED JUNE 22, 1914. RENEWED DEC. 4, 1916.
1,272,846.
Patented July 16, 1918.
6 SHEETS—SHEET 1.
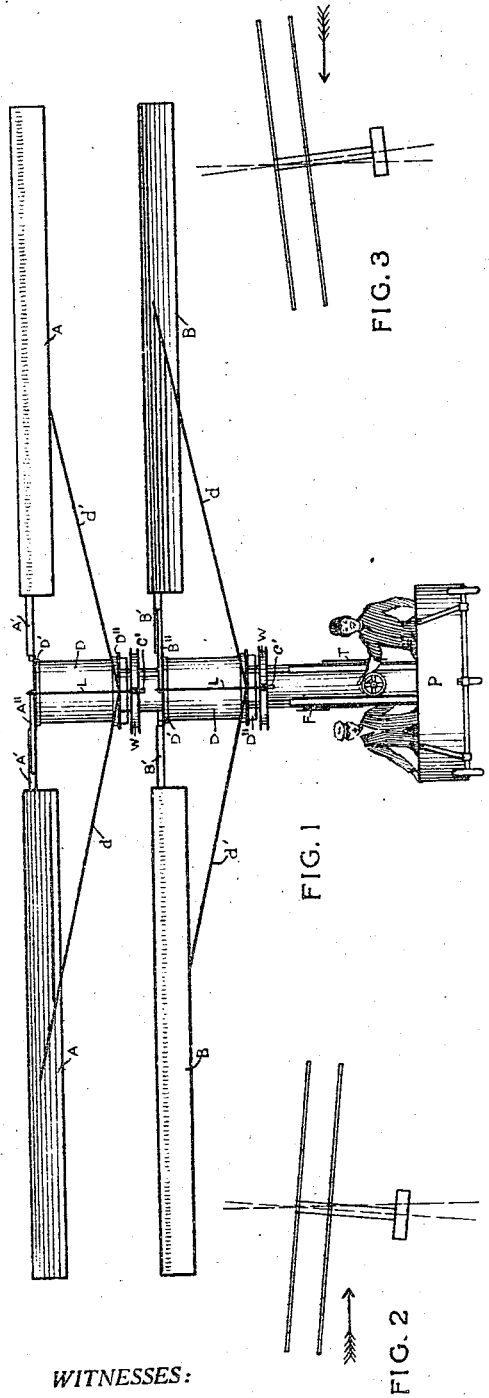
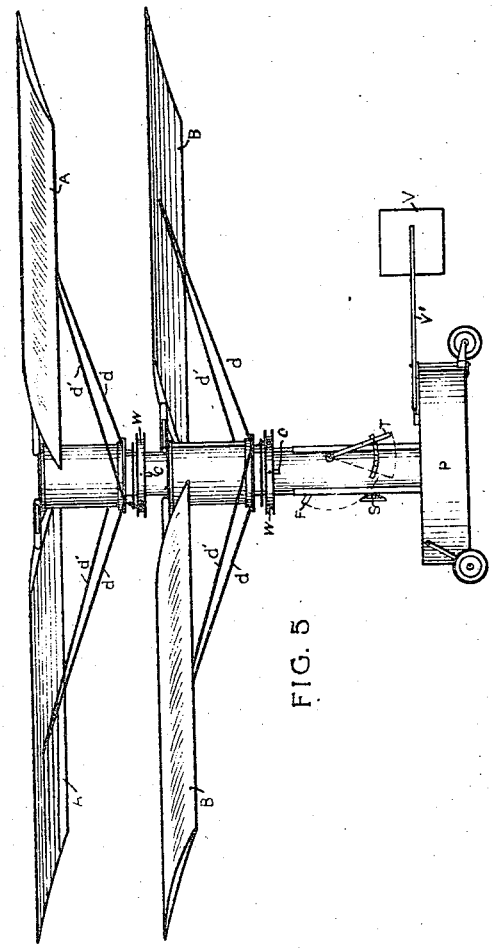
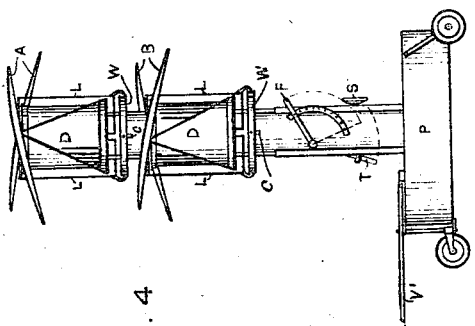
WITNESSES:
INVENTOR.
Thomas O. Perry.

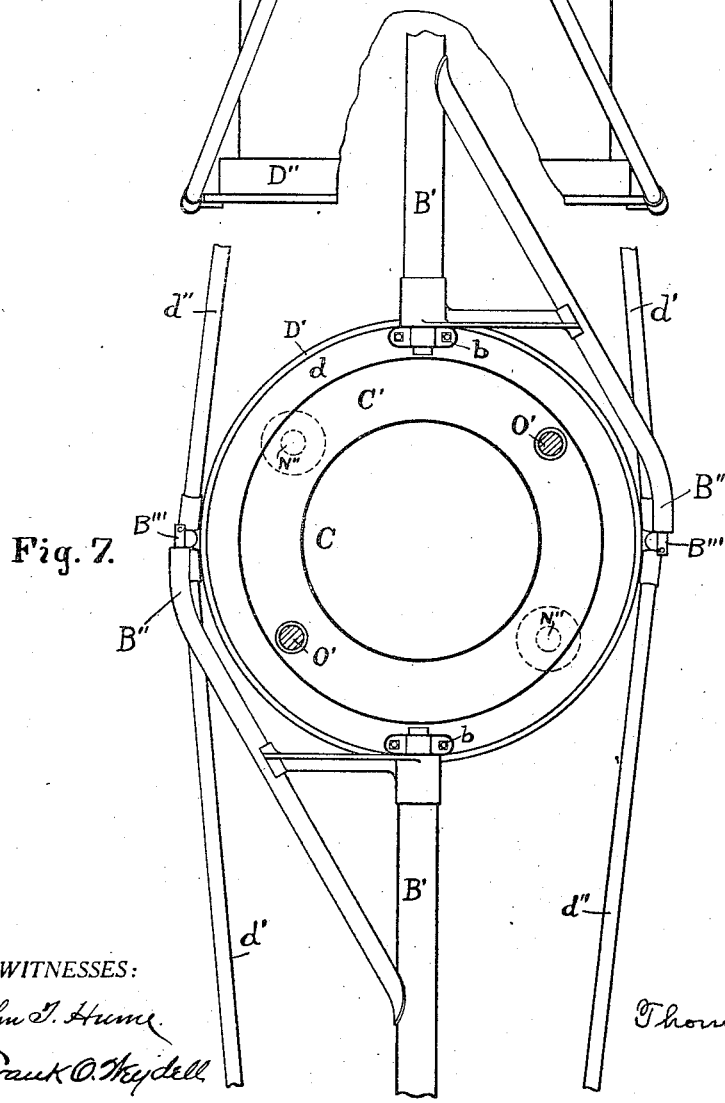

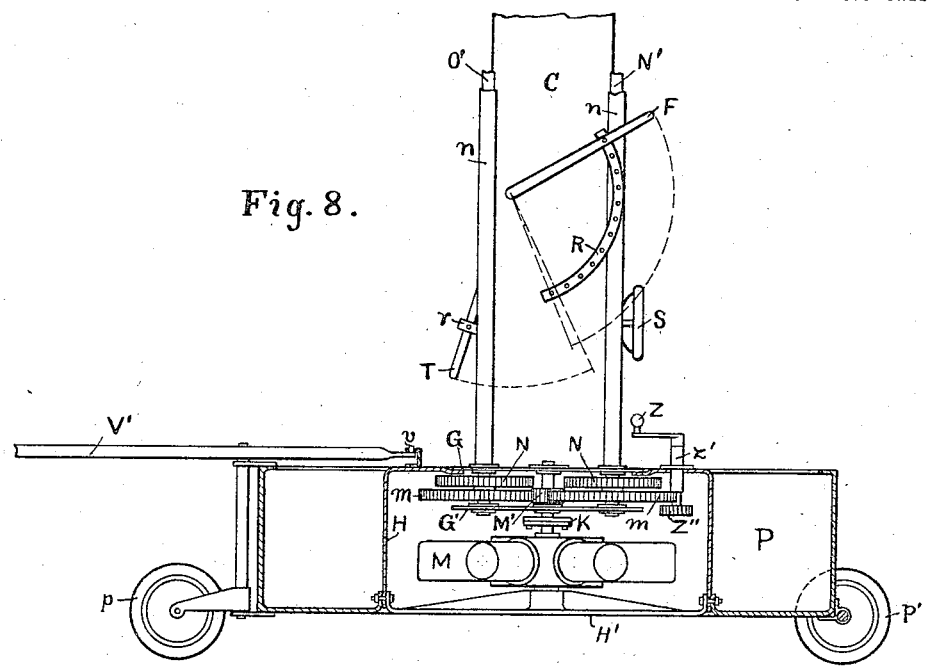
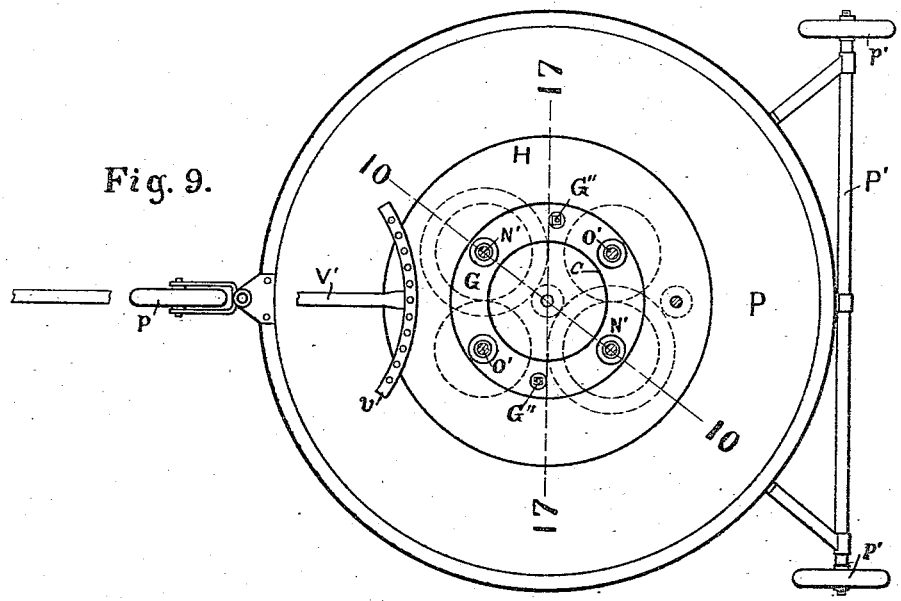

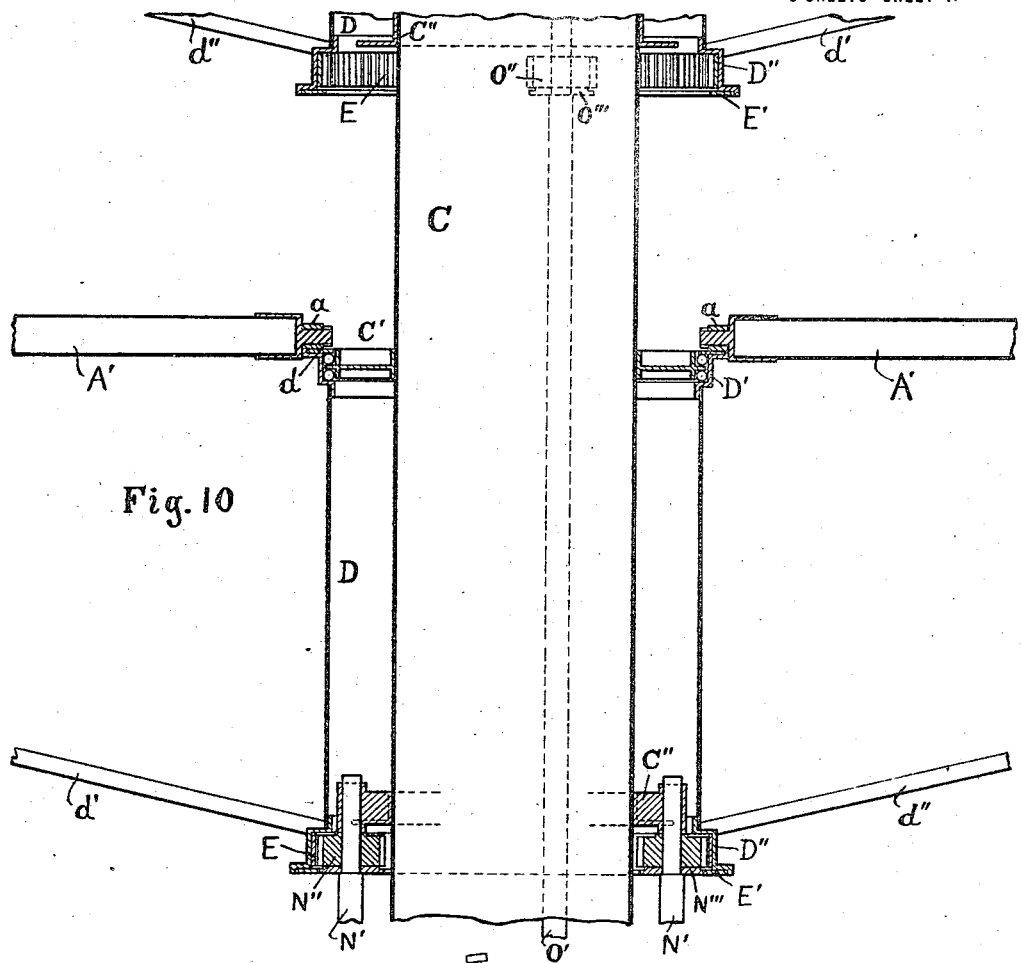
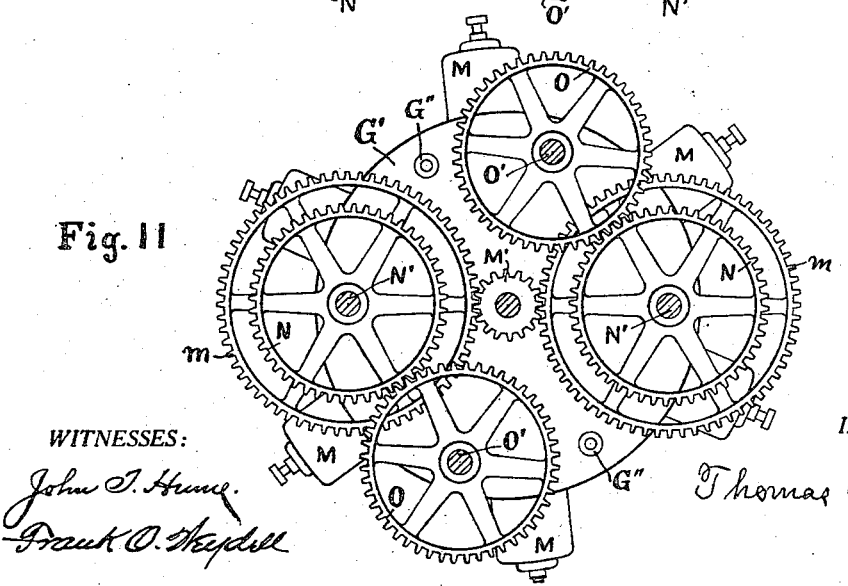

T. O. PERRY.
AIRCRAFT FOR MECHANICAL FLIGHT AND AUTOMATIC SOARING.
APPLICATION FILED JUNE 22, 1914. RENEWED DEC. 4, 1916.
1,272,846.
Patented July 16, 1918.
6 SHEETS—SHEET 5.
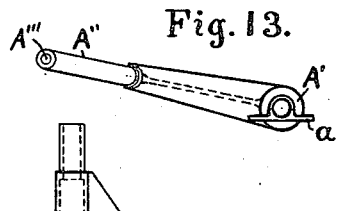
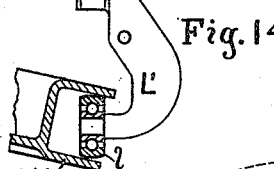
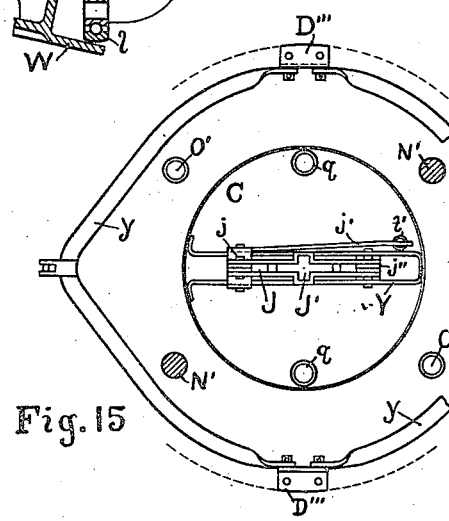
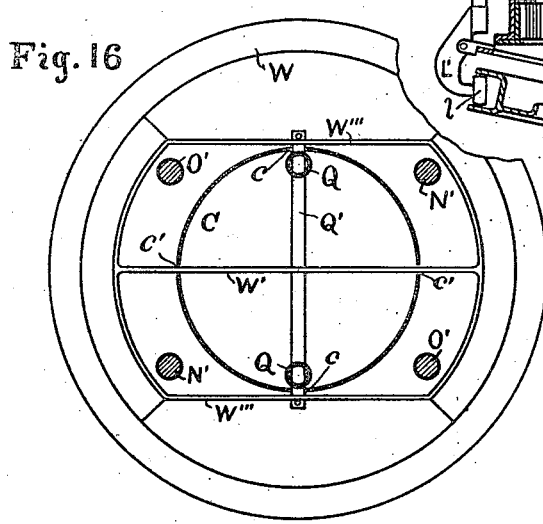
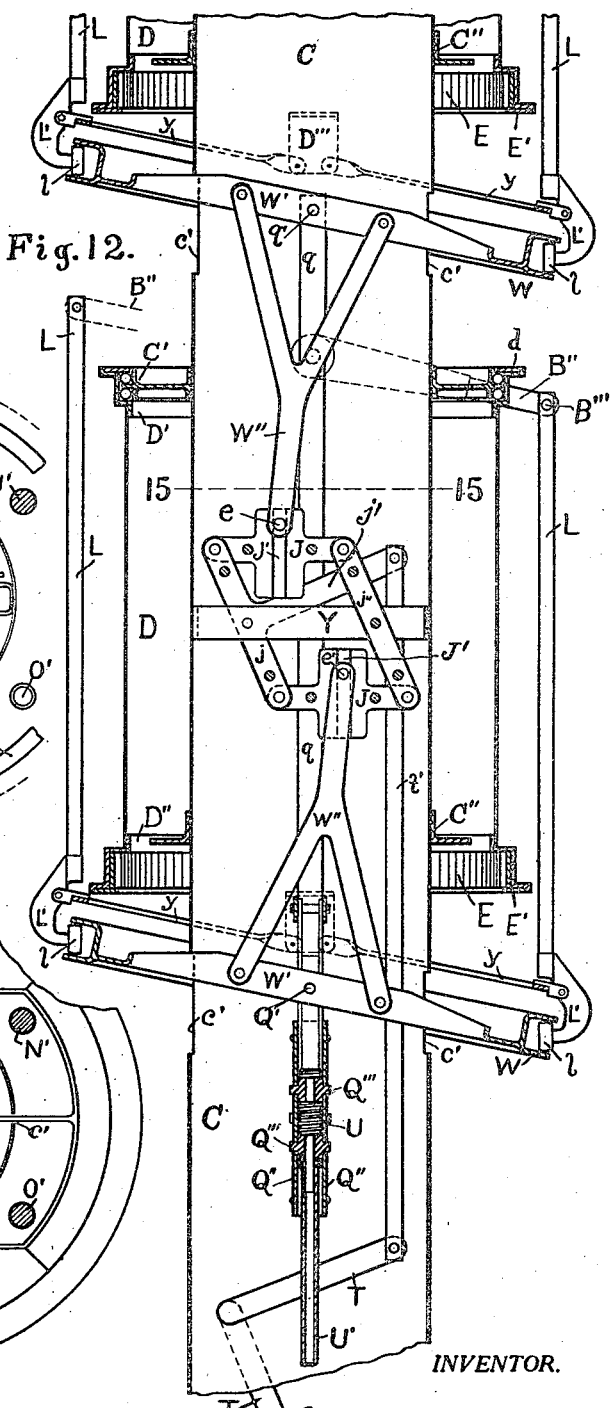
WITNESSES:
John T. Hume
Frank O. Heydell
INVENTOR.
Thomas O. Perry.

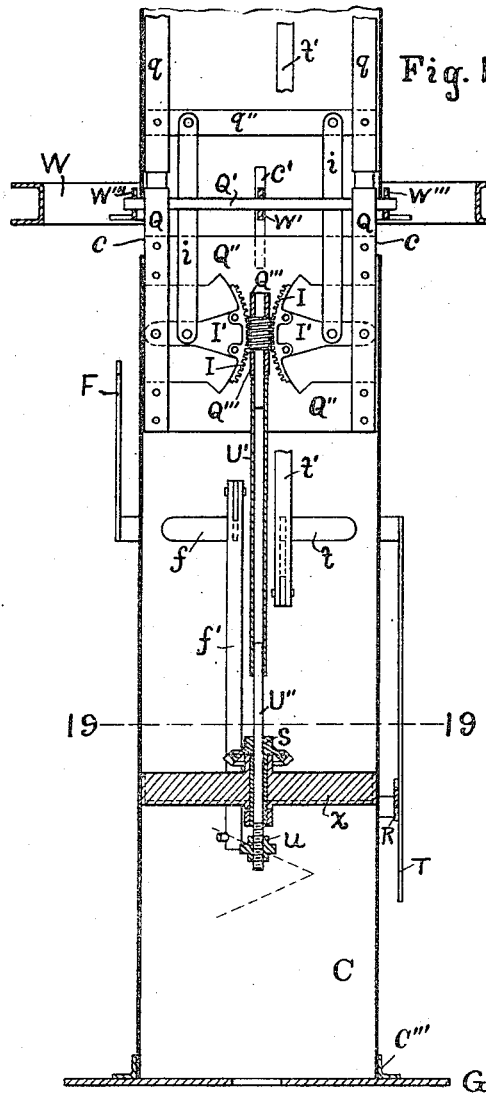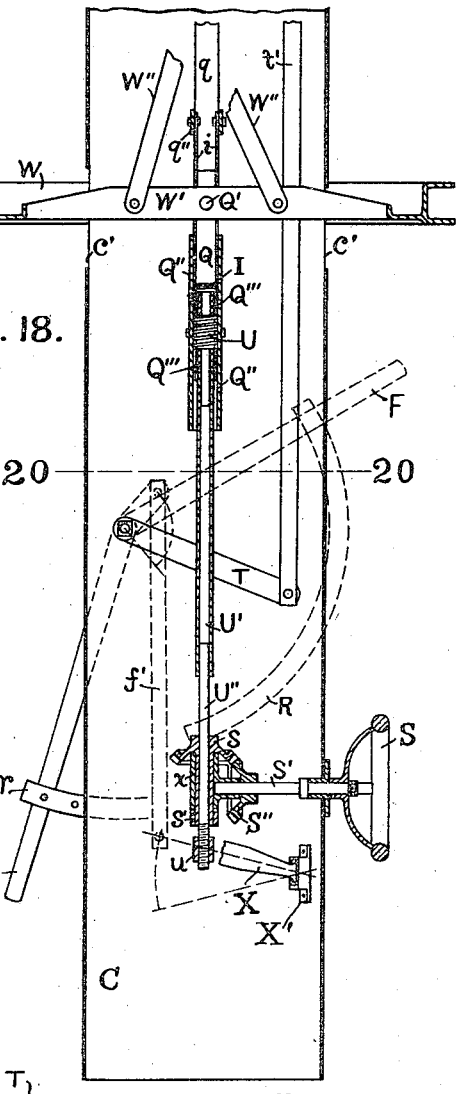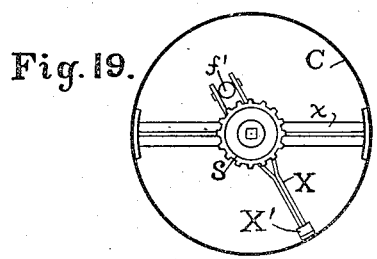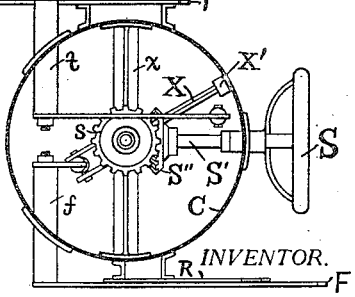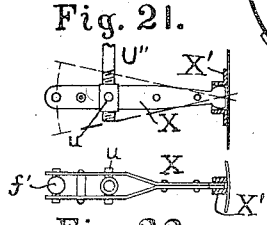

UNITED STATES PATENT OFFICE.

THOMAS O. PERRY, OF OAK PARK, ILLINOIS.

AIRCRAFT FOR MECHANICAL FLIGHT AND AUTOMATIC SOARING.

1,272,846.     Specification of Letters Patent.     Patented July 16, 1918.

Application filed June 22, 1914, Serial No. 846,648. Renewed December 4, 1916. Serial No. 135,007.

*To all whom it may concern:*

Be it known that I, THOMAS O. PERRY, a citizen of the United States, residing at Oak Park, in the county of Cook and State of Illinois, have invented a new and useful Aircraft for Mechanical Flight and Automatic Soaring, of which the following is a specification.

My invention relates to improvements in air-crafts for mechanical flying and automatic soaring of the type known as helicopters in which the wings revolve about a vertical axis in two sets, preferably upper and lower, one set of wings revolving in a direction the reverse of the other set; and the objects of my improvements are, first, to provide for adequate actuation of the revolving wings by means of a motor; second, to provide for altitudinal control of vertical ascent and descent through feathering of the wings in unison; third, to provide tractional control of horizontal travel through periodic variable feathering of the wings as they revolve; fourth, to provide for directional control of travel through differential featherings of the two sets of wings; and, fifth, to accomplish soaring flight possibly even without the immediate aid or with greatly reduced aid of the motor after horizontal travel is well under way.

I attain these objects by the mechanism illustrated in the accompanying drawings, in which—

Figure 1 is a front view of the air-craft showing both sets of wings set parallel with each other and at right angles to the supposed course of horizontal travel.

Fig. 2 is a diagrammatical view of the air-craft reduced to one quarter the scale of Fig. 1 showing all the wings set flat at the zero weather angle suitable for soaring flight, and Fig. 3 is another similar view but showing the air-craft inclined to the vertical oppositely to Fig. 2.

Fig. 4 is a side view of the air-craft to the same scale as Fig. 1 and showing the wings all in the same position but looking at their ends.

Fig. 5 shows the air-craft to the same scale as Figs. 1 and 4, but the car is turned around to show the reverse side of Fig. 4 while the wings have all been turned about their vertical axis through one eighth of a complete revolution with reference to their positions shown in Figs. 1 and 4.

Fig. 6 shows an end view of one set of wings with wing levers attached six times enlarged as compared with Figs. 1 and 4, and one of the drums to which the wings are pivotally attached. Fig. 7 is a plan of parts shown in Fig. 6 to the same scale.

Fig. 8 is a side view of the passenger car to a scale three times greater than that of Fig. 1 partly in section to expose the motor and lower driving gears. Part of the spinal column and controlling levers also show. Fig. 9 is a plan of the parts shown in Fig. 8 except that the spinal column, with parts attached thereto, is cut off above the car.

Fig. 10 shows in sectional elevation a part of the spinal column, the lower wing drum and part of the upper wing drum taken in a plane indicated by the broken line 10—10 of Fig. 9. The scale is six times that of Fig. 1. Fig. 11 is a plan of the lower driving gears in position and to scale corresponding to Fig. 10. These gears are located beneath the upper surface of the car and connect with the vertical driving shafts shown in Fig. 10.

Fig. 12 shows in sectional side elevation a portion of the spinal column, the lower wing drum, part of the upper wing drum, both feathering races and other parts connected therewith. The scale is six times that of Fig. 1.

Fig. 13 is an end view, looking outward from the vertical axis, of one of the upper wing arms or axles and wing levers as it would appear pivoted at the top of the upper wing drum in correspondence to the wing lever shown oppositely at the top of the lower drum in Fig. 12.

Fig. 14 is an enlarged view, partly in section, of any one of the race followers or ball bearing terminals to the wing links four of which are shown in Fig. 12.

Fig. 15 is a plan of a link yoke and some other parts which are located below the broken line 15—15 on Fig. 12, but the traction slides show one directly over the other. Fig. 16 is a plan of either of the two feathering races and also shows a transverse section of the spinal column taken through the vertical slots $c$ and $c'$.

Fig. 17 shows in sectional elevation the lower portion of the spinal column and parts connected therewith taken at right angles to the tractional direction of travel. Fig. 18 shows in sectional elevation the lower portion of the spinal column and parts connected therewith taken parallel with the tractional direction of travel. Fig. 19 is a plan of parts located below the broken line 19—19 on Fig. 17. Fig. 20 is a plan of parts located below the broken line 20—20 on Fig. 18. Fig. 21 is a side view of the diagonal lever partially shown in Fig. 18 and Fig. 22 is a plan of the same diagonal lever. Figs. 15 to 22 inclusive are drawn to a scale six times that of Fig. 1.

Similar letters represent similar parts throughout the several views.

A A represent the upper set of wings whose arms A' A' extend oppositely in line from the top of a drum D to which they are pivotally connected at their inner ends. Stays $d'$ $d''$ extending from opposite sides of the base of the drum converge outward and upward to pivotal connections with the wings at points some distance from their outer extremities. These points of connection are preferably just in front of the outer extremities of the wing arms and the wing arms are preferably located somewhat in front of the lateral centers of the wings. The wing arms are preferably made of thin steel tubing of considerable diameter so as to give sufficient torsional rigidity to the wings attached thereto. The wings are shown as extending considerably beyond the extremities of the arms.

The stays too, are supposed to be made of thin steel tubing so as to resist thrust as well as tension although the stays usually will be subjected to tension only. The body of the wing drum D also is made of thin sheet steel which rigidly connects together the drum head D' with the drum base D'' both of which are substantial steel rings. A'' A'' represent wing levers which are securely attached to the inner ends of the wing arms and, with reference to their circular motion, reach forward to points outside of the drum heads where their ends A''' B''' may pivotally connect with the feathering wing links L L which hang in a vertical plane located at right angles to the vertical plane which contains the axes of the wing arms.

The drum is supported by and revolves around a spinal column C on double ball bearings which roll between the ball race C' secured to the spinal column and the drum head D'. The lower set of balls are designed to sustain the downward pull of the spinal column and the upper set are designed to hold the drum centered with reference to the vertical axis of the column. A retaining ring $d$ keeps the upper balls in place.

A second wing drum D is located at a suitable distance below the one already described and is of precisely the same construction and is supported by and made to revolve about the spinal column in like manner the only difference being that the direction of revolution is reversed. The lower set of wings B B and all their connections also are like the upper set except that they are adapted to a reversed motion.

E E represent internal ring gears secured within the bases of the two drums. N'' and O'' are pinions which mesh with the lower and upper drum gears respectively. N' and O' are vertical shafts carrying at their upper ends the corresponding pinions and having their upper bearings in the bearing rings C'' C'' secured on the outside of the spiral column. Pinion disks, one of which is shown as N''', of diameters equal to the pitch circles of the pinions N'' O'', have rolling contact with bearing rings E' E' corresponding with the internal ring gears and insure proper meshing of the gear teeth. The vertical shafts N' and O' extend down to corresponding driving gear wheels N and O located between and having their bearings in two gear plates G and G' which are rigidly secured to each other by means of the plate posts G''.

The upper gear plate G may be secured to the foot of the spinal column by means of the base ring C''', shown in Fig. 17 but omitted from Figs. 8 and 9 to avoid complication.

The gear wheels N N are mounted on the same shafts, and turn in unison, with the main gear wheels $m$ $m$ which mesh with the motor pinion M'. The motor is preferably of the internal combustion type having cylinders radially arranged around a vertical crank shaft, not materially different from several now commonly used, and need not be further described. The motor is located as indicated in Figs. 8 and 11, beneath the lower gear plate G', resting upon the motor bracket H' which is bolted to the motor housing H, which in turn is suspended from the upper gear plate G. The connection between the motor and motor pinion is preferably made by means of a clutch K. The passenger car P surrounds and is supported by the motor housing H. The two gear wheels N N revolve in the same direction and through the shafts N' N' and pinions N'' N'' drive the lower wing drum D on diametrically opposite sides. In a similar manner the gear wheels O O which mesh with and are driven by the gear wheels N N drive through the shafts O' O' and pinions O'' O'' the upper wing drum from opposite sides but in a reverse direction so that the torsional effort which drives one set of wings is counteracted by the torsional effort which drives the other set of wings. If these opposite torsional efforts were not equal the passenger car would revolve in a disagreeable manner.

By means of the crank Z and starting pinion Z'' the motor can be started. The connecting shaft Z' can slide vertically in its bearing $z$ so that the pinion which is normally disengaged can be raised up into mesh with one of the main driving gears for temporary use. For some distance above the car the shafts N' N' and O' O' are inclosed by tubular shields $n$ $n$.

The feathering of the wings is attained through mechanism acting to raise or depress the wing links L which connect with the wings as already described. The lower ends of the wing links are provided with axles L', extending at right angles to the links, which carry on ball bearings, as shown in Fig. 14, link wheels or race followers $l$ whose peripheries are zones of a spherical surface. So these link wheels or race followers are adapted to travel at any angle within limits between the two parallel surfaces of the peripheral groove around either of the feathering races W W located just under both upper and lower drums. The race followers are held and propelled within the groove of the feathering races by the link yokes $y$ $y$ which have pivotal connection with the link axles and are hinged to two widely separated fulcrums D''' D''' secured to the drum bases D'' D'' on opposite sides.

The feathering races are pivotally supported on the pivot rods Q' $q'$ which pierce loosely the race fulcrum bars W'''' W'''' just outside of the spinal column on either side thereof. The pivot rods also pierce the spinal column on diametrically opposite sides passing through feathering slots $c$ which permit of vertical movement of the pivot rods. The pivot rods are themselves fixed in the upper ends of the feathering posts Q $q$, the upper ends of posts Q Q telescoping into the lower ends of posts $q$ $q$ so that the two sets of feathering posts may have a limited amount of vertical movement relatively to each other. The upper pivot posts $q$ $q$ are tied together at their upper ends by the pivot rod $q'$ and their rigidity as a pair is further secured by the feathering bars $q''$ near their lower ends. Rigidity of the lower set of feathering posts is effected in the same way through connection at their lower ends by broad feathering plates Q'' as well as by the pivot rod Q'.

Midway between the feathering posts Q Q and inclosed between the feathering plates Q'' Q'' is mounted a worm U whose shaft U' turns in close boxes Q''' Q''' fixed to the feathering plates. Engaging with the worm on each side are circular worm racks I I mounted on rack levers I' I' whose outer ends are fulcrumed on the feathering posts Q Q. Steering links $i$ $i$ connect these rack levers with the feathering bars $q''$. The worm shaft U' reaches downward and has fixed thereto a square shank U'' extending loosely through a square hole in the hub of a miter gear $s$ which is supported and turns in a steering bracket $x$ fixed to the spinal column. The hub of miter gear $s$ extends through the bracket in the form of a journal and is retained from axial movement by the collars $s'$. Beneath the bracket $x$ the shank of the worm shaft U'' is threaded at its lower extremity to receive a trunnion nut $u$ which has pivotal connection with a diagonal lever X fulcrumed at one end in a slotted bracket X' fixed to the spinal column and connected at the other end by a feathering link $f'$ with the inner arm of the feathering lever F whose outer arm or handle is within convenient reach of an operator outside of the spinal column. In the various figures the handle of the feathering lever is shown raised up to its extreme limit and the weather angle of the wings as shown corresponds to this position of the feathering lever. When the handle of the feathering lever is depressed to the other limit of its movement, as indicated by a broken line, the wings are all made to assume the minimum weather angle which is practically zero with reference to the planes of their revolution. It has been assumed so far that the feathering races W W have been maintained parallel to the planes of wing revolution and moved only by raising or depressing their pivot rods and that both sets of wings have been set alike. Obviously, between limits, the wings may be set at any weather angle desired by the operator. R represents a segment fixed to the spinal column for holding the feathering lever in any desired position.

A steering shaft S' carries at its inner end a steering miter gear S'' and at its outer end, projecting through a bracket on the spinal column, a steering wheel S. The miter gears S'' and $s$ mesh together so that the worm U may be rotated in either direction by means of the steering wheel without interfering in any way with the feathering movement of the worm shaft when employed for raising or depressing the feathering races. Rotation of the worm U causes a relative change in the weather angles of the upper and lower set of wings without necessarily changing the aggregate weather angle. The pitch of the worm and trunnion nut may be so proportioned that the actual change of weather angle in the upper wings will be offset by an equal opposite change in the weather angle of the lower wings. In any event one set of wings will be given a relatively greater or less weather angle by turning the steering wheel one way or the other with the result that whichever set of wings has the greater weather angle will prevail over the other set in rotating the passenger car contrary to its own direction of revolution. Obviously the steering wheel can be used to instantly arrest any contrary rotation of the car due to chance inequality in the torsional resistance of the two sets of wings. Or the car may be turned in either direction at will.

Tractive effort is maintained from the wings in a direction at right angles to their axis by tilting both feathering races more or less from the position shown in Fig. 18 to that shown in Fig. 12. When the feathering races are tilted out of a plane parallel with the planes of wing rotation, the weather angles of the wings are made to vary as the link wheels or race followers $l$ travel around in the inclined races giving the wing links a vertical as well as a circular movement. The result is a tractive effort of the wings parallel with their planes of rotation and at right angles to the pivotal axes of the feathering races in the direction of their lower edges. For when any link wheel arrives at the upper tilted edge of the race the corresponding wing is traveling backward with an increased weather angle suitable for propulsion while at the same time the opposite wing is traveling forward with a diminished weather angle and offers diminished resistance by reason of its link wheel having arrived at the lower edge of the race. When the feathering races are tilted as shown in Fig. 12 the weather angle on the propelling side is double that shown in Fig. 6 while on the opposite or advancing side it is reduced to zero. The wing positions of maximum propulsion and least resistance are opposite and in line with the pivotal axes of the feathering races. While passing the line of tractive effort and travel, either in front of or behind the spinal column, the wings assume the normal weather angle they would have if the races were not tilted as then their link wheels are in line with the pivot rods $Q'q'$.

For tilting the feathering races diametrical race bars $W'$ $W'$ pierce the spinal column through vertical slots $c'$ which allow the races to be tipped as well as moved bodily up and down. Within the spinal column a race arm $W''$ extends downward from the race bar $W'$ to which it is secured and a similar arm $w''$ extends upward from the corresponding race bar of the lower feathering race. The ends of the arms $W''$ $W''$ which approach each other have pins $e$ $e'$ projecting on either side adapted to engage vertical grooves $J'$ $J'$ in the upper and lower slides J J. The grooves $J'$ $J'$ are maintained in vertical positions and moved horizontally in opposite directions by connecting points on each slide laterally remote from each other with opposite ends of a pair of parallel arms $j$ $j''$ pivoted centrally on a traction bracket Y which is secured to opposite sides of the spinal column. A traction arm $j'$ is attached to the side of one of the arms $j$ which spreads at its central portion so as to straddle the bracket Y. From the end of the arm $j'$ a traction link $t'$ reaches down to the inner arm of the traction lever T fulcrumed on the spinal column in the bracket $t$ and whose handle hangs outside of the spinal column within easy reach of the operator. A segment $r$ secured to the spinal column serves to hold the handle in any desirable position. As shown in Fig. 18 the traction handle is pushed to its limit rearward where it holds the feathering races parallel with the planes of wing revolution and in Fig. 12 the handle is shown pulled forward to set the feathering races at their limit of inclination for greatest tractive effort. The pins $e$ $e'$ are shown near the top of their respective grooves $J'$ $J'$ but these pins will travel downward in these grooves when the handle of the feathering lever F is depressed. The feathering lever and traction lever may be moved in either direction independently of each other or may be operated simultaneously without the one interfering with the other or with the use of the steering wheel.

After the air-craft has gained some headway horizontally through the tractive effort of the wings, the vane V which extends rearward from the car P may help to steady the car against turning aimlessly about its vertical axis or may be used for guiding the direction of travel, but when it is desired to travel too slowly for effective use of the vane V the steering must be effected through relative weathering of the two sets of oppositely revolving wings by means of the steering wheel. At any time when the motor is driving the wings the vane V may be dispensed with entirely. If the motor should fail to operate or if it is desired to glide with the motor shut off the vane will be useful and perhaps necessary for directing the course. Also when the motor is shut off the starting crank and pinion Z Z'' may be used to revolve the wings by hand, both for steering and placing them in any desired relative position. One set of wings may be placed parallel with the other and both sets placed at right angles to the course for effective volplaning while at the same time the feathering of the wings can be adjusted for greatest efficiency.

Figs. 2 and 3 are intended to illustrate one feature of aerial flight whereby a sustaining force may be derived from wind waves in addition to that derived directly from the motor, for the purpose of relieving the motor more or less and economizing fuel. The amount of this additional force derivable from the wind is dependent upon the quality of the wind as regards puffiness and also upon the mass of waving air encountered by reason of rapid propulsion through the air billows by the motor or otherwise. Even without horizontal propulsion by the motor, as when the air-craft drifts with the average velocity of the wind, which always blows with a succession of pulsations, the wind's sustaining power is considerable. Figs. 2 and 3 represent the air-craft as drifting with the wind from left to right with all of its wings set at the zero weather angle. Fig. 2 shows the craft heeled over toward the right by an increasing puff of wind. The heeling over is due to the great surface and relative lightness of the wings as compared to the smaller surface and relatively great weight of the car and its contents which are suspended at considerable distance below the wings. The result is that the increasing puff acts on the under sides of the wings to lift them up. In Fig. 3 the air-craft has outstripped a diminishing puff of wind through the momentum it received previously and is heeled over toward the left as if by a negative puff. The result is that the air again lifts against the under sides of the wings. These positive and negative puffs of wind succeed each other constantly always acting against the under sides of the wings with a lifting effect, due to the pendulum like swing of the car. Now if through propulsive action of the motor previous to assumption of the zero weather angle, or by volplaning afterward, the air-craft has been set in rapid motion with reference to the medium in which it travels, it will with minimum head resistance encounter a vastly increased number of wind waves with a corresponding increase in the lifting effect. For while the negative puffs may give negative results against the swiftly fleeting wings the increased effect of the increasing puffs will offset this loss and the aggregate effect of each complete wave will not be diminished.

So far we have considered the air waves as acting only in a horizontal direction, or we have considered only the horizontal components of the waves which in reality act in all sorts of directions. The vertical components of the air waves are perhaps even more intense in their lifting effect on the wings, though their action is quite different and is due to the form of the wings themselves. The under sides of the wings are made slightly concave and their upper surfaces are more than correspondingly convex. The air waves impinge downward as well as upward but get a better hold against the under sides of the wings and produce in the aggregate a decided lifting effect proportional to the number of billows encountered. With sufficient motion relative to the surrounding medium the number of billows encountered by the wings set at or near to the zero weather angle may be much more than sufficient to overcome the action of gravitation and even cause the air-craft to rise rapidly, and the attainment of elevation can be converted into several times that much horizontal travel in any direction by the simple act of volplaning, which is now well understood. But it is not necessary to wait for elevation before progressing when the ability to rise is constantly available. The elevating power can be utilized for progression, without rising, by the simple expedient of tilting the air-craft as a whole to a more or less negative angle for volplaning through shifting the movable weight of passengers in the car. Or the simultaneous lifting and propelling action of air waves, when all of the wings are tilted forward to a somewhat negative angle, may be understood by resolving the aggregate resultant impulse, which is normal to the plane of inclination of the wings as a whole, into its vertical and horizontal components. In this connection, the utmost reduction of head resistance becomes all important, but beyond furnishing a structure and mechanism favorable to refinement in this direction, we do not here elaborate this feature.

Under certain conditions, supplemental support may be derived from the air waves by setting all the wings at or near to their zero weather angles so as to offer little resistance to rotation, as well as to progression, in which position the motor can keep the wings revolving rapidly with much less than the normal consumption of fuel. The zero weather angle is the most favorable for utilizing the lifting force of the waves and the revolving of the wings brings them in contact with a greatly increased mass of air. In case of forced descent through failure of the motor or other cause the wings may be set at their zero weather angles and revolved by the operator using the starting crank Z for that purpose. In this way the wings are made to act most effectively as parachutes.

The motor must be used for getting the air-craft to ascend from the ground and in the drawings the wings are all shown as set at a favorable angle for lifting vertically. But first before starting the motor the wings should be set at their zero weather angles and kept there after starting the motor until it gets warmed up so as to develop its full power. Otherwise the wings would be producing a strong downward current of air to worse than no purpose against which it would be difficult for the air-craft to rise. After the motor has gained full efficiency the feathering lever F may be raised to weather all the wings as shown in the drawings and they will then immediately lift against a comparatively undisturbed mass of air or even against a rising current of air, if the wings should first be set at a weather angle somewhat negative.

If, when it is desired to ascend, a wind should be blowing that would cause the aircraft to drift inconveniently the traction lever T may be pulled forward enough to give the wings a tractive effort sufficient to counteract the drifting effect of the wind at the same time that the feathering lever is raised. In this way vertical ascent can be accomplished in spite of the wind. And in a similar manner the air-craft may be made to descend vertically by heading into the wind and setting the traction lever so that the travel through the surrounding medium will equal the velocity of the wind while at the same time the feathering lever is manipulated to regulate the rate of descent. While the feathering and traction levers may be manipulated either independently or simultaneously, yet when the wings are exerting a tractive effort the simultaneous feathering of all the wings modifies their tractive efforts in a way that may necessitate further adjustment of the traction lever if it is desired to maintain constant altitude during flight. Also a change of the tractive effort through readjustment of the traction lever modifies the lifting effort of the wings so that whenever the wings are driving the aircraft horizontally a change in the setting of either of these levers may require readjustment of the other.

The passenger car is provided with three wheels p p' for running it along the ground when it is desired to push the air-craft into a hangar or roll it from place to place. One of the ground wheels p is a caster permitting the car to be pushed in any direction. By setting the wings all parallel with each other and also parallel with the vane V the air-craft may be pushed through a narrow door into a hanger only wide enough to receive the car.

Ordinarily the vane V, if used at all, will remain set parallel with the line of travel, but can be used for steering when soaring or volplaning. For this purpose the vane arm V' is pivoted on the vertical axis of the caster p and a circular holding segment v serves to hold the vane arm V' in any desired angular position.

The ability of an air-craft to rise straight up from the ground and to descend vertically is obviously a very great desideratum, making it possible to ascend or alight in restricted places where starting and landing with aeroplanes which require a run along the ground would be impossible in one case and disastrous in the other. In order to accomplish this purpose it will nearly always be necessary to manipulate both the feathering and the traction levers in conjunction with each other, that is, whenever the wind would prevent controlling vertical movement by means of the feathering lever alone. Almost as important is the ability to remain stationary over one spot at chosen altitudes whether the wind blows or not, and to move horizontally in any direction with as little speed as may be desired. This involves simultaneous manipulation of the steering wheel with both the traction and feathering levers since an ordinary rudder is not available for guidance until a considerable speed has been attained.

Another very important feature of this air-craft is the facility with which nearly the whole power of the motor may be utilized for climbing, when quick ascension may be necessary during flight, without losing control of direction, though an ordinary rudder would become useless with loss of horizontal motion.

Economy in motor fuel is of great importance, as upon this largely depends the duration of continuous flight attainable and the distance that may be covered without interruption. Perfect attainment of soaring flight would permit entire suspension of fuel consumption and afford unlimited possibilities in duration and distance of travel. Partial accomplishment of soaring flight, at least, is assured by the mechanism herein disclosed.

The important feature about the wings, aside from the means employed for feathering them to any desired weather angles, is their form whereby the air encountered by them through the action of the motor or otherwise is impelled downward in sufficient volume and with sufficient velocity. For the lifting effect is in proportion to the product of the mass of air impelled downward by the velocity of the vertical movement imparted to the air by the wings. It is for this reason that the wings are made somewhat concave on their under sides and that their upper surfaces have a corresponding convex curvature. That this form also favors soaring flight as previously mentioned is incidental and fortunate. The curvature of the upper surfaces is made greater than that of the lower surfaces so that there may be room for the wing arms A' B' between the surfaces about midway of their widths. The effective curvature of the wings on the whole is a mean between the curvatures of the two sides. For it is not the under side alone that directs the change in direction of the air current. The air also clings to and flows along the upper surface of the wing and the two currents flowing along the two sides meet and are directed in their united course by the combined influence of the upper and lower rear surfaces at their trailing edges. The leading edge of the wing is principally concerned with meeting the air without undue commotion and with the least possible head resistance. Inclosing the wing arm between the wing surfaces so "that the air currents meeting or flowing along shall encounter no obstruction" is in a measure borrowed from my construction of a windmill sail as described and claimed in U. S. Patent No. 772,052 issued to me Oct. 11, 1904. So I do not claim that the form of wing here shown is entirely new; but

I claim:

1. In an air-craft, the combination with an upper set of radially pivoted wings adapted to revolve about an approximately vertical axis, an under set of radially pivoted wings adapted to revolve about said vertical axis in an opposite direction from the upper set of wings and a motor adapted to actuate both sets of wings simultaneously, of means for changing the weather angles of all the wings in like manner for controlling vertical movement of the air-craft, additional means for relatively changing the weather angles of one set of wings with reference to the other set for balancing or unbalancing opposing torsional effects and mechanism whereby all the said wings as they revolve may be made to assume continually varying weather angles for the purpose of propelling the air-craft in a direction at right angles to the common axis of the revolving wings, substantially as herein set forth.

2. In an air-craft, the combination with an upper set of radially pivoted wings adapted to revolve about an approximately vertical axis, an under set of radially pivoted wings adapted to revolve similarly to the upper set but in a reverse direction and a motor adapted to actuate both sets of wings simultaneously, of means for changing the weather angles of all the wings in like manner for controlling vertical movement of the air-craft, additional means for relatively changing the weather angles of one set of wings with reference to the other set for balancing or unbalancing opposing torsional effects and mechanism whereby the wings as they revolve may be made to alternately increase and decrease their normal weather angles for propelling the air-craft in a direction parallel with the planes of revolution of the wings, substantially as herein set forth.

3. In an air-craft, the combination with an upper pair of radially pivoted wings adapted to revolve horizontally about an approximately vertical axis, an under pair of radially pivoted wings similar to the upper pair but adapted to revolve in a reverse direction and a motor adapted to actuate both pairs of wings simultaneously, of means for changing the weather angle of all the wings in like manner for controlling vertical movement of the air-craft, additional means for relatively changing the weather angles of one pair of wings with reference to the other pair for balancing or unbalancing opposing torsional effects and mechanism whereby said wings also act to propel the air-craft in a direction parallel with their planes of revolution by assuming increase of weather angle during the half revolution when such wing moves rearward and decrease of weather angle when moving forward with respect to the direction of horizontal progress, substantially as herein set forth.

4. In an air-craft, the combination with an upper set of radially pivoted wings adapted to revolve about an approximately vertical axis, an under set of radially pivoted wings similar to said upper set but adapted to revolve in a reverse direction and a motor adapted to actuate both sets of wings simultaneously, of means for changing the weather angle of all the wings in like manner for controlling vertical movement of the air-craft, additional means for relatively changing the weather angles of one set of wings with reference to the other set for balancing or unbalancing opposing torsional effects and mechanism whereby said wings also act to propel the air-craft in a direction parallel with their planes of revolution by assuming increase of weather angle during the half of revolution when each wing moves rearward and decrease of weather angle when moving forward with respect to the direction of horizontal progress, substantially as herein set forth.

5. In an air-craft, the combination with a supporting column approximately vertical in normal position, a passenger car located at the base of said column, an upper structure carrying radially pivoted wings and other parts adapted to revolve around the upper part of said column, an under structure similar to said upper structure but adapted to revolve in an opposite direction about said column and a motor adapted to rotate said structures simultaneously in opposite directions, of means for changing the weather angles of all the wings in like manner for controlling vertical movement of the air-craft, additional means for changing relatively the resistance to rotation of said structures with reference to each other for balancing or unbalancing opposing torsional effects and mechanism whereby all of said wings as they revolve may be made to assume continually varying weather angles for the purpose of propelling said air-craft in a direction parallel with the planes in which the wings revolve, substantially as herein set forth.

6. In an air-craft, the combination with a supporting column approximately vertical in normal position, a passenger car located at the base of said column, an upper structure carrying radially pivoted wings and other parts adapted to revolve around the upper part of said column, an under structure similar to said upper structure but adapted to revolve in an opposite direction about said column and a motor adapted to rotate said structures simultaneously in opposite directions, of means for changing the weather angles of all the wings in like manner for controlling vertical movement of the air-craft, additional means for changing relatively the resistance to rotation of said structures with reference to each other for changing or maintaining direction of travel and mechanism whereby the wings of each structure intermittently assume decreased weather angles while moving forward with reference to the travel of their axes and increased weather angles while moving rearward as they revolve for producing tractive effort in the direction of flight, substantially as herein set forth.

7. In an air-craft, the combination with upper and lower sets of radially pivoted wings adapted to revolve in opposite directions about approximately vertical axes and a motor adapted to simultaneously actuate said oppositely revolving sets of wings, of means for simultaneously feathering in unison all of said wings to various weather angles for controlling vertical lifting force of the wings, additional means for increasing or decreasing the torsional effort required to actuate one set of wings as compared with the torsional effort applied to the other set of wings for changing or maintaining direction of travel and mechanism whereby each wing as it revolves may be made to assume a weather angle greater than normal during one half of each revolution and less than normal during the other half revolution for producing tractional effort parallel with the planes of wing revolution, substantially as herein set forth.

8. In an air-craft, the combination with upper and lower sets of radially pivoted wings adapted to revolve in opposite directions about approximately vertical axes and a motor adapted to simultaneously actuate said oppositely revolving sets of wings, of means for simultaneously feathering in unison all of the wings to various weather angles for controlling vertical lifting force of the wings, additional means for increasing or decreasing the torsional effort required to actuate one set of wings as compared with the torsional effort applied to the other set of wings for changing or maintaining direction of travel and mechanism whereby the wings of each set intermittently may be made to assume increased weather angles while moving rearward as they revolve and decrease weather angles while moving forward for producing tractive effort in the direction of flight, substantially as herein set forth.

9. In an air-craft, the combination with upper and lower sets of radially pivoted wings adapted to revolve in opposite directions about approximately vertical axes and a motor adapted to simultaneously actuate said oppositely revolving sets of wings, of mechanism whereby the weather angles of said wings are continuously changed above and below their normal amplitude during each revolution about their axes for producing a propulsive action in a direction parallel to the planes in which the wings revolve, means for feathering to various weather angles all of the wings in unison for varying the lifting effort of said wings in a vertical direction and a steering device for directing the course of flight, substantially as herein set forth.

10. In an air-craft, the combination with superposed sets of radially pivoted wings adapted to revolve horizontally in opposite directions, a motor for actuating said wings, driving gears for transmitting the power of said motor and a supporting spinal column, of a feathering race, race followers connected with said wings and mechanism whereby at the will of the operator the position of said race may be changed bodily for altering the amplitude of the weather angles of the wings at any time, substantially as herein set forth.

11. In an air-craft, the combination with upper and lower sets of radially pivoted wings adapted to revolve in opposite directions about approximately vertical axes and a motor adapted to simultaneously actuate said oppositely revolving sets of wings, of mechanism whereby the weather angles of said wings are decreased in amplitude while moving forward with reference to the advancement of their axes and increased in amplitude while moving rearward as they revolve for producing propulsive effort parallel to their planes of revolution, means for feathering to various weather angles all of the wings in unison for varying the lifting effort of said wings in a vertical direction and a steering device for controlling the horizontal direction of flight, substantially as herein set forth.

12. In an air-craft, the combination with superposed sets of radially pivoted wings adapted to revolve horizontally in opposite directions, a motor for actuating said wings, driving gears for transmitting the power of said motor and a supporting spinal column, of feathering races, race followers connected with said wings and mechanism whereby at the will of the operator the positions of said races may be changed bodily for altering the amplitude of the weather angles of the wings at any time, substantially as herein set forth.

13. In an air-craft, the combination with upper and lower sets of radially pivoted wings adapted to revolve in opposite directions about approximately vertical axes and a motor adapted to simultaneously actuate said oppositely revolving sets of wings, of mechanism whereby the weather angles in each set of wings is intermittently changed in amplitude between limits during each revolution for producing a propulsive effort parallel with the planes of revolution, means for adjusting in unison the weather angles of all the wings for controlling vertical movement of the air-craft and steering mechanism for directing the course of flight, substantially as herein set forth.

14. In an air-craft, the combination with superposed sets of radially pivoted wings adapted to revolve horizontally in opposite directions, a motor for actuating said wings and driving gears for transmitting the power of said motor, of a supporting spinal column inclosing the vertical axes of said sets of wings, mechanism for feathering all the wings in unison to various weather angles and means whereby the weather angle of one set of wings may be changed relatively to the weather angle of the other set of wings for causing angular movement of said column about its vertical axis in either direction at will, substantially as herein set forth.

15. In an air-craft, the combination with upper and lower sets of radially pivoted wings adapted to revolve in opposite directions about approximately vertical axes, a motor for actuating simultaneously said oppositely revolving sets of wings and driving gears for transmitting the power of said motor to said wings, of mechanism for feathering all the wings in unison to various weather angles for varying the vertical lifting effort of the wings and means whereby the weather angles of one set of wings may be changed relatively to the weather angles of the other set of wings for balancing or unbalancing the torsional resistances to revolution of opposing sets of wings, substantially as herein set forth.

16. In an air-craft, the combination with two superposed sets of radially pivoted wings adapted to revolve horizontally in opposite directions, and means for propelling said wings, of a feathering race for each set of wings, race followers connecting with both sets of wings and mechanism whereby at will both races may be bodily moved in unison or one race may be moved relatively to the other race for changing the weather angles of the two sets of wings either alike or relatively, substantially as herein set forth.

17. In an air-craft, the combination with two superposed sets of radially pivoted wings adapted to revolve horizontally in opposite directions, and means for propelling said wings, of a feathering race for each set of wings mounted on pivotal supports, race followers connected with each set of wings and mechanism whereby at will said races may be moved bodily in unison or relatively with respect to each other or may be tilted on their pivots in unison for lifting, steering and tractive effects, all of which movements may occur independently or simultaneously, substantially as herein set forth.

18. In an air-craft, the combination with two superposed sets of radially pivoted wings adapted to revolve horizontally in opposite directions, and means for propelling said wings, of a feathering race for each set of wings mounted on pivotal supports, race followers connected with each set of wings and mechanism whereby the two races may at will be moved in unison by tilting or in parallel direction bodily for the purpose of giving the wings continuously varying weather angles as they revolve or intermittent changes of weather angle or simultaneous changes of both kinds, substantially as herein set forth.

19. In an air-craft, the combination with superposed sets of radially pivoted wings having arched surfaces adapted to revolve horizontally in opposite directions, a supporting column extending below said wings and a motor adapted to actuate said wings located at the base of said column, of adjustable mechanism whereby the weather angle of each wing during its revolution may be reduced from normal while advancing with reference to axial progress and may be increased in amplitude during the half revolution when it moves rearward, means for simultaneously reducing or increasing in amplitude the weather angles of all the wings for reducing head resistance or increasing their lifting and propulsive efforts and a rudder for laterally directing the course of flight, substantially as herein set forth.

20. In an air-craft, the combination with superposed sets of radially pivoted wings having arched surfaces adapted to revolve horizontally in opposite directions, a supporting column extending below said wings and a motor adapted to actuate said wings suspended at the base of said column, of adjustable mechanism whereby the weather angle of each wing during each revolution may be reduced below normal while advancing with reference to axial progress and may be increased in amplitude during the half revolution when it moves rearward, means for simultaneously reducing or increasing in amplitude the weather angles of all the wings for reducing head resistance or increasing their lifting and propulsive efforts, additional means for balancing or unbalancing the torsional efforts required to actuate said oppositely revolving sets of wings for laterally directing the course of said aircraft when progressing slowly and an additional steering device for guiding the aircraft in rapid flight, substantially as herein set forth.

21. In an air-craft, the combination with upper and lower sets of radially pivoted wings adapted to revolve in opposite directions about approximately vertical axes and a motor adapted to simultaneously actuate said oppositely revolving sets of wings, of mechanism whereby the weather angles of said wings are continuously changed above and below their normal amplitude during each revolution about their axes for producing a propulsive action in a direction parallel to the planes in which the wings revolve, and means for increasing or decreasing the torsional effort required to actuate one set of wings as compared with the torsional effort applied to the other set of wings for changing or maintaining direction of travel, substantially as herein set forth.

22. In an air-craft, the combination with two sets of radially pivoted wings adapted to revolve horizontally in opposite directions, a motor for actuating the wings and provision for feathering the wings in unison for altitudinal control of vertical ascent and descent, of manipulative mechanism for continuously feathering said wings during each revolution for tractional control and means whereby one set of wings may be differentially feathered relatively to the other set of wings for directional control, substantially as herein set forth.

23. In an air-craft, the combination with two sets of radially pivoted wings adapted to revolve horizontally in opposite directions and a motor for actuating the wings, of manipulative mechanism for featherings said wings continuously during each revolution for tractional control and means whereby one set of wings may be feathered differentially with reference to the other set of wings for directional control, substantially as herein set forth.

24. In an air-craft, the combination with two sets of radially pivoted wings adapted to revolve horizontally in opposite directions, a motor for actuating the wings and provision for feathering said wings in unison for altitudinal control of vertical ascent and descent, of manipulative mechanism for periodically feathering said wings synchronously with each revolution for tractional control and means whereby one set of wings may be feathered relatively to the other set of wings for directional control, substantially as herein set forth.

25. In an air-craft, the combination with superposed sets of radially pivoted wings adapted to revolve horizontally in opposite directions, a motor for actuating said wings and driving gears for transmitting the power of said motor to each set of wings, of feathering races, race followers connected with said wings and mechanism whereby the position of said races may be changed bodily either in unison or with respect to each other, substantially as herein set forth.

26. In an air-craft, the combination with two sets of radially pivoted wings adapted to revolve horizontally in opposite directions and a motor for actuating the wings, of manipulative mechanism for periodically feathering said wings synchronously with each revolution for tractional control and means whereby one set of wings may be feathered relatively to the other set of wings for directional control, substantially as herein set forth.

27. In an air-craft, the combination with superposed sets of radially pivoted wings adapted to revolve horizontally in opposite directions, a motor for actuating said wings and driving gears for transmitting the power of said motor to each set of wings, of pivoted feathering races, race followers connected with said wings, means for tilting said feathering races and mechanism for shifting the position of said races bodily, substantially as herein set forth.

28. In an air-craft, the combination with two structures adapted to revolve horizontally in opposite directions, a motor for actuating said structures oppositely to each other, radially pivoted wings carried by each of said structures and provision for feathering said wings in unison for altitudinal control of vertical ascent and descent, of manipulative mechanism for periodically feathering said wings in unison for altitudinal control of vertical ascent and descent, of manipulative mechanism for periodically feathering said wings synchronously with each revolution for tractional control and means whereby the opposite torsional efforts actuating the two structures may be balanced or unbalanced for directional control, substantially as herein set forth.

29. In an air-craft, the combination with two structures adapted to revolve horizontally in opposite directions, a motor for actuating said structures oppositely to each other and radially pivoted wings carried by each of said structures, of manipulative mechanism for periodically feathering said wings synchronously with each revolution for tractional control and means whereby the opposite torsional efforts actuating the two structures may be balanced or unbalanced for directional control, substantially as herein set forth.

30. In an air-craft, the combination with superposed sets of radially pivoted wings adapted to revolve horizontally in opposite directions and a motor whose power is transmitted to each set of wings, of a spinal column, wing-supporting drums encircling said column with bearings thereon, wing-arms radiating from each drum and wing-stays, diverging from a point on each wing remote from the drum to widely separated points of attachment therewith vertically distant from the attachment of said wing-arm, substantially as herein set forth.

THOMAS O. PERRY.

Witnesses:
O. C. BOWERS,
J. GUTHRIDGE.